Sept. 16, 1958        A. S. MacLAREN        2,852,140
UNITARY TANK FOR THE TREATMENT OF SEWAGE Filed March 13, 1957                                  2 Sheets-Sheet 1

INVENTOR.
ALBERT S. MacLAREN
BY
*Sanford Schnurmacher*
ATTORNEY

Sept. 16, 1958    A. S. MacLAREN    2,852,140
UNITARY TANK FOR THE TREATMENT OF SEWAGE
Filed March 13, 1957    2 Sheets-Sheet 2

INVENTOR.
ALBERT S. MacLAREN
BY Sanford Schnurmacher
ATTORNEY

United States Patent Office 2,852,140
Patented Sept. 16, 1958

2,852,140

UNITARY TANK FOR THE TREATMENT OF SEWAGE

Albert S. MacLaren, Chagrin Falls, Ohio

Application March 13, 1957, Serial No. 645,848

1 Claim. (Cl. 210—221)

This invention relates to sewage treatment systems, and particularly to a single tank system for private and semipublic use.

The primary object of this invention is to provide a unitary compartmented tank that can be used for either primary, or both primary and secondary treatment of sewage without any structural changes.

When functioning as a primary treatment unit, it will deliver a relatively clear and sediment free, unstable effluent to a filter-bed system.

When functioning as both a primary and secondary sewage treatment unit, it will deliver a clear, sediment free, completely odorless and stable effluent, suitable for disposal into a convenient run-off ditch or free flowing stream.

These, and other objects of the invention, will become apparent from a reading of the following specification and claim, together with the accompanying drawings, wherein;

Figure 1:
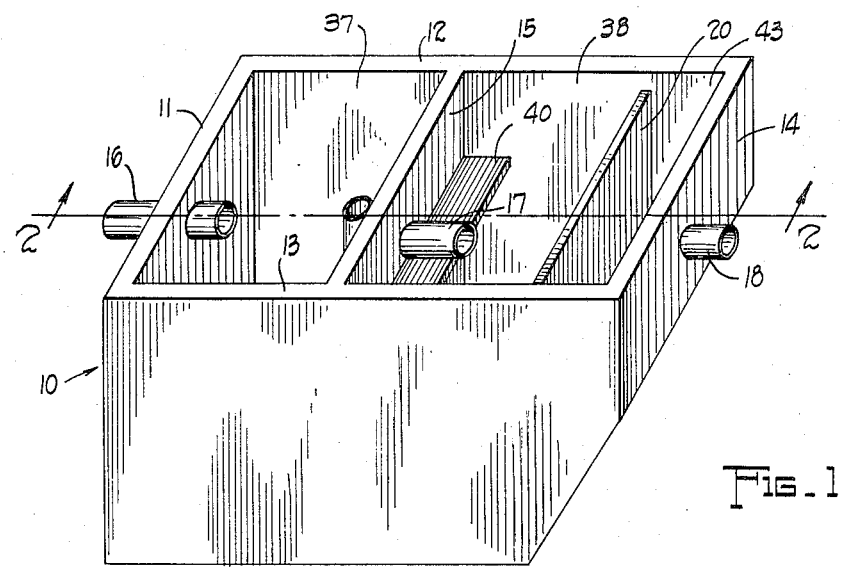
Figure 1 is a perspective view of the unitary sewage treatment tank that is the subject of this invention, as it appears when used in the primary treatment of sewage.

Referring more particularly to the drawings, there is seen the unitary sewage treatment tank that is the subject of this invention, broadly indicated by reference numeral 10. The tank 10 is fabricated from concrete, as a single unit, and is delivered to the place where it is to be used as a complete package. It is set upon a suitable foundation, with its top edge below the ground level, so that it may be closed by means of a cover, not shown, and be concealed from view by dirt thrown on top of the cover, if so desired. Suitable manhole openings are provided for entrance to the tank, when necessary.

In the preferred form illustrated, the tank 10 is rectangular in shape, having front 11, rear 14, side walls 12 and 13, and a floor 19. A transverse partition 15 positioned between the side walls 12 and 13, defines a first chamber 37 and a second chamber 38.

The second chamber 38 has a steeply inclined surface 22 on the rear wall 14, thereof, extending from the floor 19 upwardly of the lower ⅔ of the rear wall 14; the inclination of the surface 22 being approximately 65°.

Figure 2:
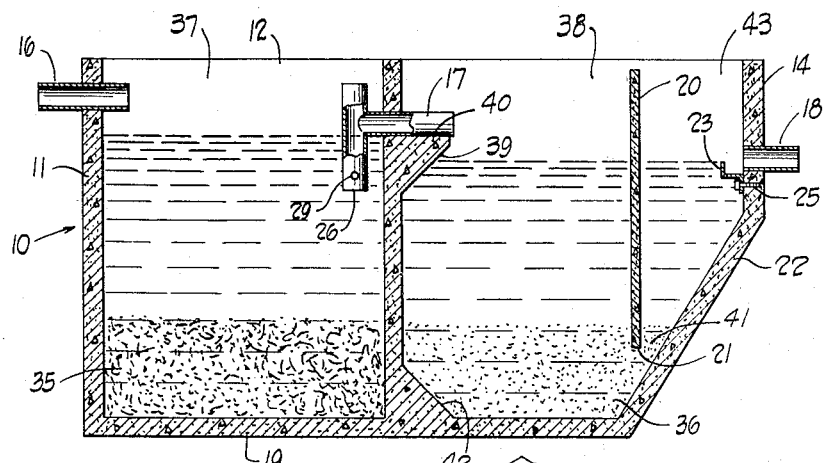
Figure 2 is a longitudinal sectional view of the same, taken along the line and in the direction of the arrows 2—2 of Figure 1.
Figure 3:
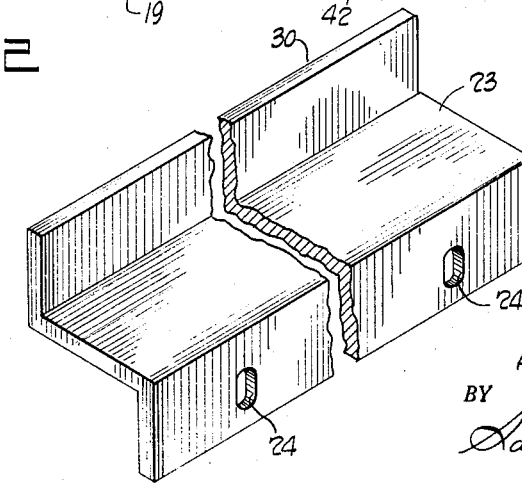
Figure 3 is a perspective view of the Z-bar, in its unmounted condition.
Figure 4:
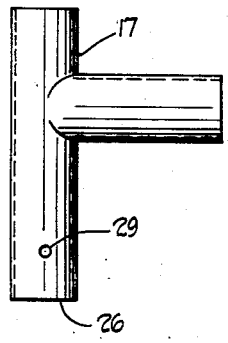
Figure 4 is a perspective view of the T-fixture.

A vertical baffle panel 20 extends between the side walls 12 and 13 of the second chamber 38, to form a sedimentation section 43. Baffle 20 is spaced from, and parallel to, rear wall 14 and extends downwardly toward the inclined surface 22, but stops short thereof at a distance of between 2″ to 4″. The space between the lower edge 21 of the baffle 20 and the inclined surface 22 defines a slot 41, extending the width of the surface 22, proximate the floor end thereof, as is seen in Figure 2. Reference numeral 16 indicates a sewage inlet pipe, mounted through the front wall 11 of the first chamber 37.

A T-fixture 17 is mounted through the partition 15 and rests on a shelf 40 on the second chamber side of the partition 15. The underside 39 of the shelf 40 is faced at an angle of 45° to the partition 15.

The bottom of the partition 15 is joined to the floor of the second chamber 38 through an inclined surface 42 set at an angle of 45° to the vertical.

The T-fixture 17 has an inlet opening 26 whose depth of penetration is relatively shallow, so that the greatest amount of space is left between the inlet 26 and the floor 19 of the first chamber 37, for the accumulation of sludge, while at the same time permitting the accumulation of a normal amount of floating scum. A pair of aligned holes 29 are located at the T-fixture inlet 26 for a purpose to be hereinafter described.

A Z-bar, or weir 23, having vertically elongated and spaced adjusting holes 24, is mounted on the rear wall 14 immediately above the inclined surface 22, by means of bolts 24. The Z-bar is adjusted so that its top edge 30 is perfectly level.

An outlet pipe 18 is positioned immediately behind the Z-bar 23, and is connected to a filter bed system for the further disposal of the effluent liquid leaving the tank after primary treatment.

For operation of the tank in the primary treatment, only, of sewage, the first chamber 37 is seeded with ripe sludge, and raw sewage is permitted to flow into the first chamber 37 through the inlet pipe 16. The heavy material and grits settle to the floor 19, mix with the ripe sludge, and are subjected to bio-chemical de-composition in the usual manner. The liquid in the first chamber is subjected to considerable gassing and agitation while the organic solids are being broken up by septic de-composition. As fresh sewage enters the tank the supernatant liquid, containing some of the flocculent material passes through the T-fixture 17 into the second chamber 38, leaving the heavy material behind as sludge 35. The liquid in the second chamber 38 is relatively quiescent, and after a period of time a layer of flocculent material 36 builds up from the floor 19 to a considerable height above the slot 41. The liquid in the second chamber 38 finds its level on both sides of the baffle 20, and eventually passes over the edge 30 of Z-bar 23 and out through the pipe 18. In view of the fact that the Z-bar edge 30 is set perfectly level, the effluent passes over the edge in a wide sheet at low velocity. As a result there is very little current flow in the sedimentation section between the baffle 20 and the rear wall 14. The combination of baffle 20 and slot 41 provides a sedimentation section 43 that is protected from all current flow occurring in chamber 38, so that the lightest flocculent material is free to gradually settle and regain equilibrium with the flocculent layer in the main part of chamber 38.

All the liquid entering the second chamber 38 must pass through the flocculent layer 36 before it can pass through the slot 41 and over the Z-bar 23. This flocculent layer never becomes a solid mass, but always remains a porous fluid layer that functions to filter out and hold any suspended material that may be carried over from the first chamber. Fluid coming over from the first chamber can only leave the second chamber by passing through the flocculent filter layer 36 and then through the slot 41. All suspended material eventually sinks and is immeshed in the filter layer 36. This flocculent layer 36 will seek its level on both sides of the baffle 20. As sewage enters chamber 38 it raises the liquid level, causing an equivalent amount to pass through the slot 41, forcing some of the flocculent filter layer 36, in the sedimentation section 43, to rise, and the supernatant liquid to pass over the Z-bar weir 23 in a very thin film.

After the liquid level returns to its original established flow line, the excess flocculent material in the sedimentation section 43 will settle back down the slope 22, back through the slot 41, and equalize in height on both sides of baffle 20.

Thus only relatively clear, sediment free, liquid passes over the Z-bar 23 and out through the pipe 18. This septic liquid, however, is not stable, is quite odoriferous, and therefore must be disposed of through a filter bed field, or other secondary treatment system before it can be allowed to run off as ground water.

The same tank 10 can be used for both primary and secondary treatment of sewage, in which case the effluent is both clear, stable, and odorless, and can be safely released into any convenient drainage ditch or stream without creating a nuisance.

Figure 5:
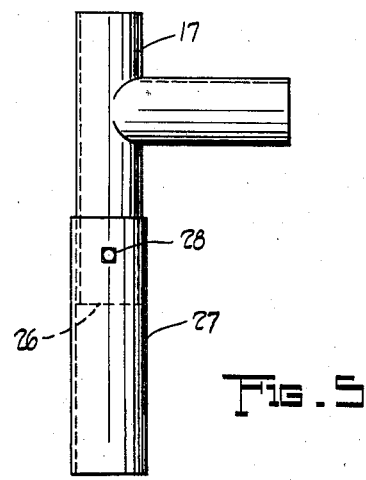
Figure 5 is a perspective view of the T-fixture with an extension sleeve mounted thereon.
Figure 6:
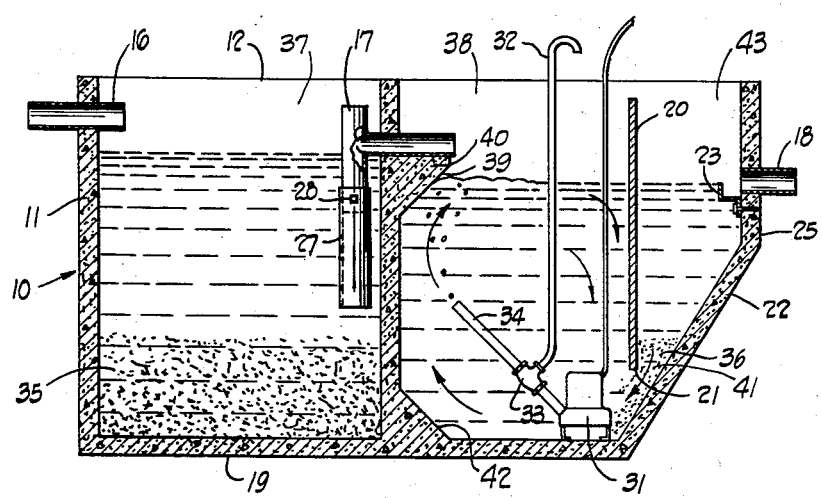
Figure 6 is a sectional view of the same tank showing it as it appears with auxiliary liquid aerating and mixing means mounted therein, for the combined primary and secondary treatment of sewage passing therethrough.

To convert the tank to both primary and secondary treatment of sewage, a sleeve 27 is mounted on the inlet end 26 of the T-fixture 17, as seen in Figures 5 and 6. The sleeve 27 is held in place by a bolt 28 which passes through the holes 29 in the T-fixture inlet end 26, described herein above. The depth of penetration of the sleeve 27 is relatively deep and is dependent on the type of secondary treatment to be used in the second chamber 38. If the activated sludge and aeration method is to be used, the penetration is between 19" and 24" from the floor 19 of the tank 10, which will provide a ripe sludge layer of between 12" to 16", depending upon the area of the liquid surface. In such a system a portion of the sludge 35 will automatically pass through the T-fixture into the second chamber 38, as new sewage brings in new sludge forming material.

Any suitable aerating and fluid circulating means may be used in the second chamber 38, such as surface jets, air diffusers, up-draft or down-draft tubes, and the like.

In the system illustrated in Figure 6, a submerged pump 31 is positioned on the floor 19. This pump has a fluid intake on its lower face and ejects the fluid through a jet tube 34 projecting upward at an angle of 45°. An aspirator unit 33 is mounted in the jet tube 34 so that all the fluid passing through the jet tube 34 also passes through the aspirator unit 33 and is aerated by air drawn into the aspirator through a tube 32 having its inlet projecting above the surface of the liquid in the chamber 38.

The activated sludge on the floor 19 is picked up by the pump and ejected from the jet tube 34 in an upward path at an angle of 45°. The circulation of the fluid is directed by the inclined surfaces 40 and 42 into a circular path so that after a time a constantly rotating stream is formed which thoroughly mixes and aerates all the material in chamber 38. The organic materials, both in solid form and in solution, are subjected to bio-chemical oxidation. As sewage enters the second chamber 38 it will cause the liquid level to rise and pass through the slot 41, carrying with it some of the mixed liquors into the sedimentation section 43. The rise of the liquid level in the sedimentation section 43 will displace an equivalent volume of supernatant liquid, in a very thin film, over the edge of the Z-bar weir 23. The activated sludge and any other solid material moved into the sedimentation section, due to this action, will settle back down the slope 22, through the slot 41, and into chamber 38 where it is again picked up and carried into the circulation of the aeration chamber 38. The effluent is clear, free of sediment, and completely stable and odorless, and can be permitted to flow off as ground water without danger of creating a nuisance.

Thus a single tank may be used for either the partial or complete treatment of sewage, which greatly reduces the cost of manufacture, as well as the cost to the home owner when converting from one system to the other, since none of the original equipment has to be discarded.

It will now be clear that there has been provided a device which accomplishes the objectives heretofore set forth.

While the invention has been disclosed in its preferred form, it is to be understood that the specific embodiment thereof, as described and illustrated herein, is not to be considered in a limited sense, as there may be other forms or modifications of the invention which should also be construed to come within the scope of the appended claim.

I claim:

A unitary structure for both the primary and secondary treatment of sewage, comprising, a tank having front, rear, side and bottom walls, and a transverse partition between the side walls defining first and second chambers, the second chamber having a steeply inclined surface on the rear wall thereof, opposite the partition, extending from the floor of the chamber upwardly of the rear wall, a vertical baffle mounted in the second chamber, between the side walls, spaced from and parallel to the rear wall and extending downward toward the inclined surface but stopping short thereof to define an elongated slot extending the width of the inclined surface proximate the floor end thereof, the first chamber having a raw-sewage inlet through its front wall, a T-fixture mounted through the partition between the chambers and draining into the second chamber, the depth of penetration of the T-fixture inlet, in the first chamber, being relatively deep, and aerating and liquid circulating means mounted in the second chamber between the partition and the baffle, for the secondary treatment of the effluent delivered from the first chamber through the T-fixture, the second chamber having an opening in the rear wall thereof, behind the vertical baffle to accommodate the effluent sewer line.

References Cited in the file of this patent

UNITED STATES PATENTS

| | | |
|---|---|---|
| 1,102,674 | Lawrence | July 7, 1914 |
| 2,057,203 | Payzer et al. | Oct. 13, 1936 |
| 2,370,974 | Langdon | Mar. 6, 1945 |

FOREIGN PATENTS

| | | |
|---|---|---|
| 253,686 | Germany | Nov. 13, 1912 |
| 446,817 | Italy | Mar. 28, 1949 |